(No Model.)
W. H. WOODWARD.
MEANS FOR TRANSMITTING POWER TO TRACTION CABLES.
No. 390,638. Patented Oct. 2, 1888.
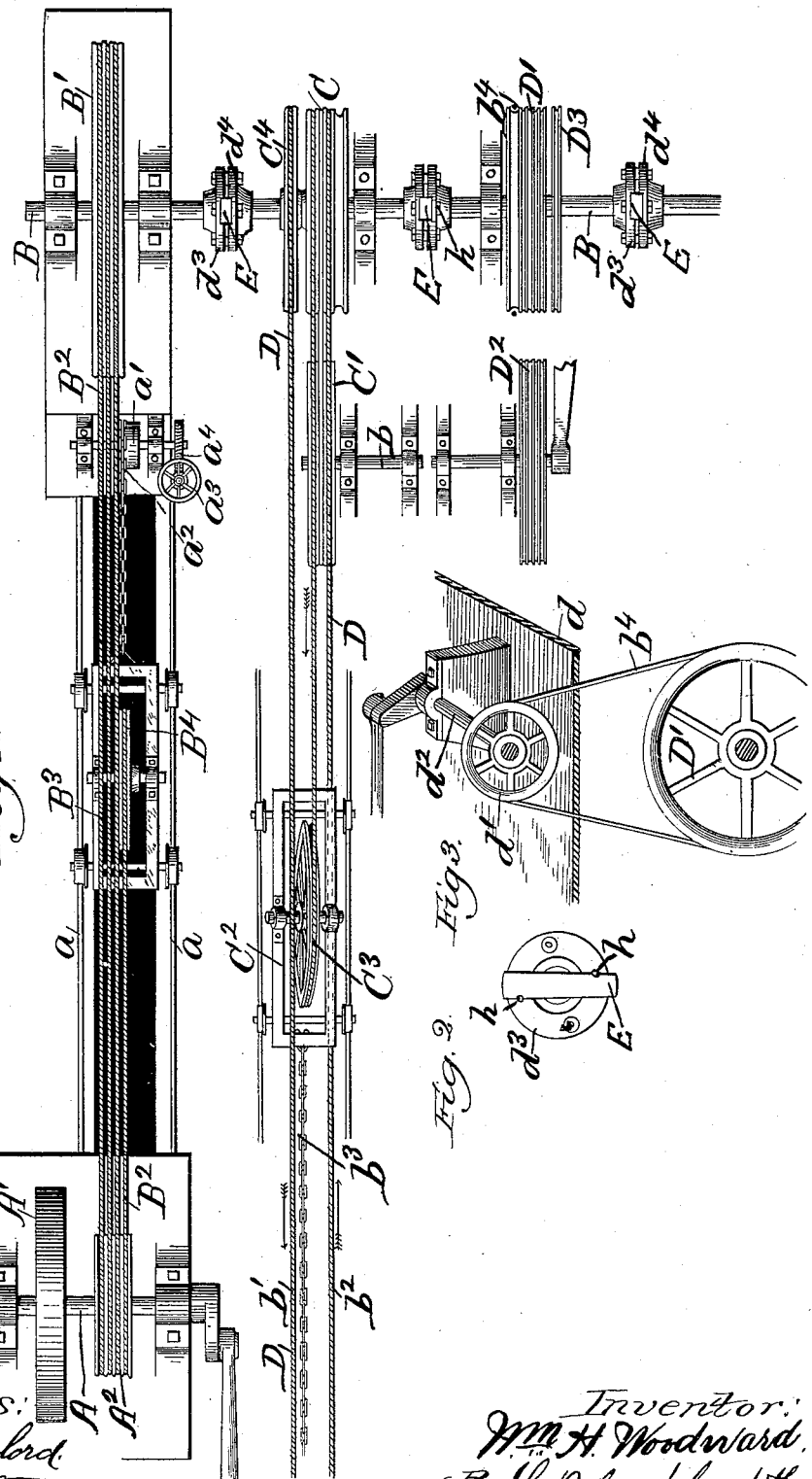

UNITED STATES PATENT OFFICE.

WILLIAM H. WOODWARD, OF CHICAGO, ILLINOIS.

MEANS FOR TRANSMITTING POWER TO TRACTION-CABLES.

SPECIFICATION forming part of Letters Patent No. 390,638, dated October 2, 1888.

Application filed June 22, 1886. Renewed September 6, 1888. Serial No. 284,695. (No model.)

*To all whom it may concern:*

Be it known that I, WILLIAM H. WOODWARD, of Chicago, county of Cook, and State of Illinois, have invented certain new and useful Improvements in Means for Transmitting Power to and Operating Traction-Cables, of which the following is a full, clear, and exact description, that will enable others to make and use the same, reference being had to the accompanying drawings, forming a part of this specification.

This invention relates to means and the arrangement of means for the transmission of motion and power to traction-cables operating street-cars; also to an arrangement whereby the operating cable or cables run direct from the main or line shaft to the street; also to an arrangement which permits of one or more cables being stopped for examination or repairs when more than one line is operated from the same shaft; also of a coupling device having a space between the faces of the same for the passage of the traction-cable when it is necessary to remove or replace the same on the cable-drums.

The object and nature of my invention will fully appear in the subjoined description and its novelty be pointed out in the claims, reference being had to the accompanying drawings, in which—

Figure 1 is a plan view of a traction-cable system in the engine or power house embodying my improved features; Fig. 2, an elevation of a shaft-coupling device, and Fig. 3 an elevation and perspective of the auxiliary connection for moving cables in making repairs and examinations.

In the drawings, A represents the engine-shaft; A', the fly-wheel, and $A^2$ a grooved driving-pulley or compound sheave mounted on said shaft; B, the main or line shaft, and B' a pulley or compound sheave mounted thereon in line with the companion pulley $A^2$ on the engine-shaft.

The grooved pulleys $A^2$ and B' are connected by the wire-rope driving-belt $B^2$, by which means the required motion and power are transmitted to the main shaft B. The driving-belt $B^2$ consists of a number of laps or coils of continuous wire rope in accordance with the degree of strength and steadiness required.

$B^3$ is a tension-carriage located between the pulleys $A^2$ and B', and is movable on the tracks $a$ $a$, and $B^4$ a tension-sheave mounted on said carriage and carrying one lap or coil of the cable belt $B^2$, whereby the required rigidity and tautness are automatically maintained in said cable belt in accordance with the load on the main shaft. The winding-barrel $a'$ is mounted upon a suitable rotating shaft and carries one end of the chain $a^2$, the opposite end of said chain being attached to the tension-carriage $B^3$. This winding-barrel is rotated by means of the hand-wheel $a^3$ and the worm and gear connection $a^4$, and serves the purpose of taking up the slack of the cable belt. The grooved drum C is rigidly mounted on the main shaft B and carries the traction-cable D.

C' is a wrapping or winding drum mounted on the counter-shaft $b$, in advance of the principal carrying-drum C, and is adapted to take one or more laps of the traction-cable, as may be necessary, in order to secure the required amount of frictional contact of the cable.

The tension-carriage $C^2$ is located between the main shaft B and the street and has the tension-sheave $C^3$ mounted thereon, which receives one lap of the traction-cable as it comes from the drum C. The sheave $C^3$ is inclined or tipped, so that the traction or working cable, paying off from the under side of the same, is led to and passes underneath the sheave $C^4$, mounted loosely on the main shaft and independent from the principal drum C. The traction-cable passes directly from this loose sheave into the street, as indicated by the arrow.

$b'$ is the outgoing part of the cable, and $b^2$ the incoming part. The tension-carriage $C^2$ is mounted on a track and moves in either direction, as may be necessary in keeping the proper strain on the working-cable. One end of the chain $b^3$ is connected to the tension-carriage $C^2$, the other end having a weight attached. By having the sheave $C^4$, from which the working-cable passes to the street, loosely mounted on the main shaft the same can run either slower or faster than said shaft as the load varies, thereby causing a quicker response and a more sensitive action of the tension or straining device and preventing unequal and heavy strains on the working-cable and the sudden jar on the cars. The feature of paying out the working-cable from a loosely-mounted sheave and directly from the main shaft also has the advantage of taking in the proportion of two feet of slack to each foot traveled by the tension-carriage.

D' is a second drum mounted on the main shaft B, and D² its companion winding-drum, which illustrates the arrangement for the running of another working-cable operating a second line. D³ is the loose sheave corresponding to the sheave C⁴. A side elevation of the drum D' is also shown in Fig. 3, where a connection is made with an auxiliary power independent of the main driving-engines. The driving-band $b^4$ leads from the drum D' to the floor $d$ above and onto the pulley sheave $d'$, mounted on the engine-shaft $d^2$. The object of this auxiliary power-connection is that where there are two or more lines being operated from the same plant, should it become necessary to stop and repair one of the cables it can be done without stopping both lines, as the main shaft can be uncoupled in a moment and the auxiliary power used to run in the cable for examination and repairs. The main shaft B in this case is composed of a number of sections coupled together. The faces $d^3$ $d^4$ of the couplings do not come closely together, as is ordinarily the case, but are held apart by means of the key E, which is just of sufficient thickness to separate the faces far enough to admit of a cable being passed between in removing or replacing the same on the cable-drums mounted on the main shaft. The wedge-key E is set a little way into both faces forming the coupling, in order to prevent lateral displacement, two of the coupling-bolts $h$ being also let part way into the key E on opposite sides (see Fig. 2) for the same purpose. Now in case of an accident to one of the working-cables, or when it becomes necessary to make an examination or repairs, the main shaft can be uncoupled and one of the lines kept running and the cable or cables removed or placed on the drums without being obliged to cut the same.

There is but one engine-connection shown; but it will be understood that a second pair of engines are connected to the opposite end of the main shaft from that shown in Fig. 1.

Having thus described my invention, what I claim as new, and desire to secure by Letters Patent, is—

1. The combination, with the main or line shaft, of a cable-carrying drum, C, mounted on said main shaft, a winding-drum, C', mounted on a counter-shaft in advance of said cable-carrying drum, a tension device located in advance of said winding-drum, and an independent sheave, C⁴, mounted loosely on the main shaft adjacent to the cable-carrying drum and from which the working-cable passes to the street, substantially as set forth.

2. The combination, with the main or line shaft, of a cable-drum, C, rigidly mounted upon said shaft, a paying-out sheave, C⁴, loosely mounted on said shaft adjacent to said cable-drum, and a sheave, C³, for leading the cable from the drum to the sheave C⁴, substantially as described.

3. The combination, with a cable, of a line-shaft, a cable-drum rigidly mounted on said shaft, a loose sheave on said shaft adjacent to the cable-drum, and a traction-carriage having a sheave over which passes the cable from the drum to the loose sheave, substantially as described.

4. The combination, with a main or line shaft constructed in sections coupled together, of one or more cable-drums mounted on said shaft, a cable for each drum, and a counter-shaft having a pulley, $d'$, substantially as described.

5. The combination of a shaft constructed of sections, each having a support, couplings for said shaft-sections, consisting of faces $d^3$ $d^4$, separated from each other by a key or wedge, and held together by bolts, cable-drums on said shaft, and cables on said drums, substantially as described.

WILLIAM H. WOODWARD.

Witnesses:
L. M. FREEMAN,
L. B. COUPLAND.